United States Patent [19]

Spinosa et al.

[11] 4,074,401
[45] Feb. 21, 1978

[54] SNAP ASSEMBLY

[75] Inventors: Dominic J. Spinosa, Wantagh; Frank Knoll, Huntington Sta., both of N.Y.

[73] Assignee: East/West Industries, Inc., Farmingdale, N.Y.

[21] Appl. No.: 751,320

[22] Filed: Dec. 16, 1976

[51] Int. Cl.² .............................................. A44B 13/02
[52] U.S. Cl. ................................. 24/236; 24/201 HE
[58] Field of Search ............ 24/236, 230.5 S, 201 HE, 24/75, 224 HE, 224 LS, 224 PS, 224 R, 224 RS; 248/306; 292/107

[56] References Cited

U.S. PATENT DOCUMENTS

| 49,654 | 8/1865 | Saladee | 24/236 |
|---|---|---|---|
| 547,877 | 10/1895 | Covert | 24/236 |
| 720,378 | 2/1903 | Phillips | 24/236 |
| 850,234 | 4/1907 | Lambert | 24/236 |
| 879,272 | 2/1908 | Key | 24/236 |
| 998,943 | 7/1911 | Armstrong | 24/236 |
| 1,044,975 | 11/1912 | Baxter | 24/236 |
| 1,296,217 | 3/1919 | Reyburn | 24/236 |
| 1,662,628 | 3/1928 | Augenstein | 24/236 |
| 2,187,441 | 1/1940 | Baxter | 24/236 |

Primary Examiner—Bernard A. Gelak
Attorney, Agent, or Firm—Leonard W. Suroff

[57] ABSTRACT

A snap assembly adapted to receive a cooperating buckle element is disclosed in which a base is provided having oppositely disposed front and rear ends with upper and lower surfaces intermediate the ends, and a hook is integrally formed with the front end of the base and extending inwardly in the direction of the rear end and terminating in a distal end. The hook having an inner surface bounding one side of the hook facing the upper surface of the base for forming an enclosure for receiving the buckle element therein. A flexible locking member is adapted to be moved relative to the inner surface of the hook, with the locking member having an outer end and an oppositely disposed free end. The outer end formed by a wall having one surface thereof extending in overlapping relationship with and secured to the base. Resilient means for continuously urging the free end of the locking member into abutting pressural engagement with the inner surface of the hook and being movable toward and away from the inner surface is provided. The resilient means comprises a rib integrally joined by an arcuate configuration at one end thereof with the wall and extending upwardly therefrom, and a clip integrally joined by an arcuate configuration at one end thereof with the other end of the rib. The clip terminates in the free end of the locking member and is inclined upwardly relative to the base for movement relative thereto. The movement of the locking member provides an angle of deflection in the clip and in the rib so as to obtain a relatively large translation of the free end of the locking member while maintaining a relatively low stress concentration in the locking member by distribution of the stress in each of the arcuate configurations.

18 Claims, 10 Drawing Figures

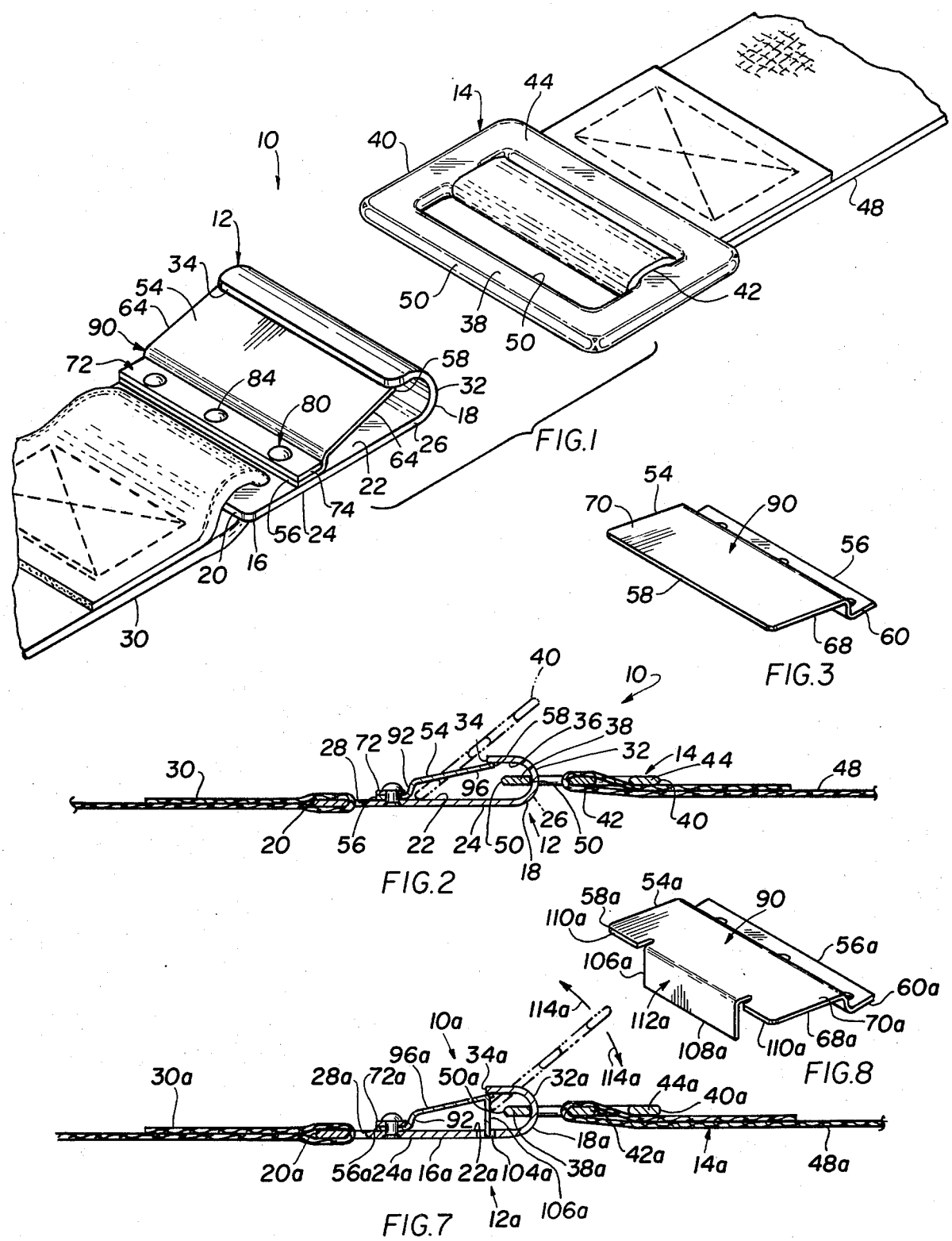

SNAP ASSEMBLY

BACKGROUND OF THE INVENTION

1. Field of The Invention

The present invention relates to a snap and buckle assembly, and more particularly an assembly ideally suited for high load conditions such as in a parachute system.

2. Description Of The Prior Art

The various forms of coupling devices generally illustrated in the prior art are primarily directed to those applications that do not require the ability to withstand high loads. Accordingly, certain features of these prior art devices do not lend themselves to the unique problems when a snap assembly is to be utilized for example as part of a parachute system. The inventors have found that due to the load conditions, the stress factor is substantially increased in the moving locking member of the assembly. In contrast to the prior art devices, there is provided resilient means to obtain a high strength, quick release, snap connection, in which the stress concentrations are properly distributed.

In accordance with one embodiment of the present invention, there is also provided indicating means to advise the user when the buckle is improperly disposed relative to the snap assembly. This embodiment also provides closing means to limit the movement of a buckle element relative to the snap assembly.

The above described combined indicating and closing means should not be confused with certain structure, as illustrated in U.S. Pat. Nos. 831,991; 2,260,215; 1,662,628; and 3,688,349. These prior art patents are cited in that there is provided a flexible locking member that can be received within a groove in a base portion. As will be evident from the disclosure to follow, the present invention distinguishes over these references in that the stopping aspect of the closing means is dimensioned to form a rigid shoulder relative to the base so as to prevent inward movement of the buckle element in the normal position of the snap assembly. This characteristic is also true with respect to the device illustrated in U.S. Pat. No. 2,278,266 in that an opening is provided in the base in order to receive a tab when one desires to insert or remove the mating buckle therefrom.

Although the present invention is ideally suited for high load conditions, such as in a parachute system, it will be appreciated that whenever a quality snap assembly is required, irrespective of its use or application, the present invention will provide such a device.

OBJECTS OF THE INVENTION

An object of the present invention is to provide a snap assembly ideally suited for high load conditions and in which the buckle is readily inserted in the assembly and maintained in the proper load position.

Another object of the present invention is to provide a snap assembly which receives a buckle and the dimensional relationship prevents the buckle from binding, wedging, locking, or falling into any incorrect position which would result in a malfunction.

Another object of the present invention is to provide a snap assembly in which the flexible locking member is provided with a double form portion in order to provide resilient means with the stress concentration equally distributed over the respective portions of the locking member.

Another object of the present invention is to provide a snap and buckle assembly that is readily assembled and disassembled such that the buckle may be easily inserted and also permitting ready movement of the buckle relative to the snap assembly for positioning in various locations.

Other objects and advantages of the present invention will become apparent as the disclosure proceeds.

SUMMARY OF THE INVENTION

A snap assembly adapted to receive a cooperating buckle element is disclosed in which a base is provided having oppositely disposed front and rear ends with upper and lower surfaces intermediate the ends, and a hook is integrally formed with the front end of the base and extending inwardly in the direction of the rear end and terminating in a distal end. The hook having an inner surface bounding one side of the hook facing the upper surface of the base for forming an enclosure for receiving the buckle element therein. A flexible locking member is adapted to be moved relative to the inner surface of the hook, with the locking member having an outer end and an oppositely disposed free end. The outer end formed by a wall having one surface thereof extending in overlapping relationship with and secured to the base.

Resilient means for continuously urging the free end of the locking member into abutting pressural engagement with the inner surface of the hook and being movable toward and away from the inner surface is provided. The resilient means comprises a rib integrally joined by an arcuate configuration at one end thereof with the wall and extending upwardly therefrom, and a clip integrally joined by an arcuate configuration at one end thereof with the other end of the rib. The clip terminates in the free end of the locking member and is inclined upwardly relative to the base for movement relative thereto. The movement of the locking member provides an angle of deflection in the clip and in the rib so as to obtain a relatively large translation of the free end of the locking member while maintaining a relatively low stress concentration in the locking member by distribution of the stress in each of the arcuate configurations.

In accordance with one embodiment of the invention, indicating means is provided that includes a groove extending transversely through the base, with a closing member having a terminal end. The closing member being integrally formed with the locking member and extending towards the base, and the closing member being in alignment with the groove for movement therein. The terminal end of the closing member being disposed above the lower surface in the normal position of the locking member, and the terminal end of the closing member being disposed beyond the lower surface when the buckle element is interposed intermediate the inner surface of the hook and the locking member, such that the user of the snap assembly may readily determine that the buckle element is improperly positioned.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 1 is a perspective view of the snap and buckle assembly in detached condition prior to assembly thereof;

FIG. 2 is a side plan view of the snap and buckle assembly coupled to each other;

FIG. 3 is a perspective view of the locking member utilized in the snap and buckle assembly illustrated in the embodiment of FIG. 2;

FIG. 7 is a view of a snap and buckle assembly, similar to FIG. 2, illustrating another embodiment of the present invention;

FIG. 8 is a perspective view, similar to FIG. 3, illustrating the locking member utilized in the embodiment illustrated in FIG. 7;

DETAILED DESCRIPTION OF THE DRAWINGS

Figure 4:
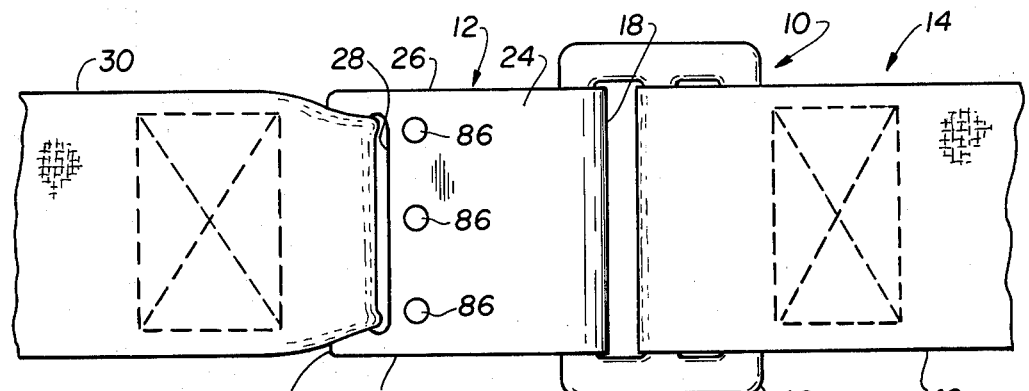
FIG. 4 is a bottom plan view of the snap and buckle assembly illustrated in FIG. 2.

Referring to the drawings, and initially to FIGS. 1 through 6, there is illustrated one embodiment of the present invention including a snap and buckle assembly 10. The snap assembly 12 and buckle assembly 14 are designed to be readily assembled and disassembled from each other. The snap assembly 12 includes a base 16 having oppositely disposed front end 18 and rear end 20 with upper and lower surfaces 22 and 24, respectively, intermediate the ends 18 and 20. A pair of sides 26 extend between the ends 18 and 20. A slot 28 extends transversely on the base 16 adjacent the rear end 20 between the sides 26 for receiving a harness or strap 30 therein in a conventional manner.

A hook 32 is integrally formed with the front end 18 of the base 16 and extends in the direction of the rear end 20 and terminates in a distal end 34. The hook 32 has an inner surface 36 bounding one side of the hook 32 facing the upper surface 22 of the base 16 for forming an enclosure for receiving the buckle element 38 of the buckle assembly 14. The buckle assembly 14 includes a buckle member 40 having additional buckle elements 42 and 44 with a harness or strap 48 secured in a conventional manner to buckle element 42.

The inner surface 36 of the hook 32 having an arcuate configuration at the front end 18 of the base 16. To permit movement of the buckle element 38 within the spacing defined, the dimension between the opposing end walls 50 of buckle element 38 is selected to be less than the distance between the inner surface 36 and upper surface 22. In this manner the buckle member 40 may readily take the position illustrated by the broken lines in FIG. 2. This is important in order to permit ready movement of the buckle member 40 without the possibility of any binding, wedging, or locking. It is most important that the buckle member 40 be ready for immediate use when same is required.

Figure 5:
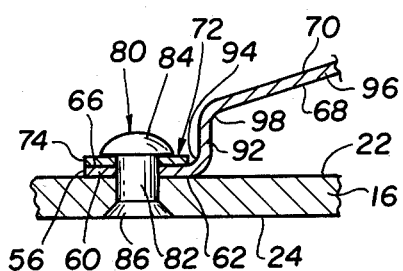
FIG. 5 is a fragmentary enlarged view illustrating the mounting and dimensional relationship of the locking member.
Figure 6:
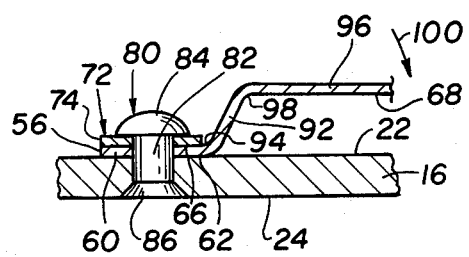
FIG. 6 is a view similar to FIG. 5 illustrating the locking member disposed in a depressed condition.

In operative relationship with the hook 32, there is provided a flexible locking member 54 adapted to be moved relative to the inner surface 36 of the hook 32. The locking member 54 has an outer end 56 and an oppositely disposed free end 58. The outer end 56 formed by a wall 60 having one surface 62 thereof extending in overlapping relationship to the upper surface 22 of the base 18. The locking member 54 may be of a width substantially equal to the width of the base 16 as defined by the spaced apart sides 26. In this manner the spaced apart sides 64 of the locking member 54 may be of the same width as the base 16. The wall 60 has a spaced apart upper surface 66, as illustrated in FIGS. 5 and 6.

In order to provide the desired spring loading characteristics to the flexible locking member 54, it is formed from a relatively thin sheet of material. For example, the thickness of the locking member between the opposed surfaces 68 and 70 may be 0.010 inches. Obviously this dimension may vary with the selected function and load characteristics to which the assembly 10 is to be subjected. The thickness of the base 16 as defined by the opposing surfaces 22 and 24 may be approximately 0.036 inches, and this dimension may also vary. Having established this dimensional relationship, it can be appreciated that the wall portion 60 has to be secured to the base 16 in such a manner that when the free end 58 of the locking member 54 is deflected, the stress is evenly distributed.

The inventors have found that it is necessary to provide load distribution means 72 extending in overlapping relationship to the oppositely disposed surface 66 of the wall 60. The load distribution means 72 may include a rectangular plate 74 in order to sandwich the wall 60 between the plate 74 and the base 16. There is provided coupling means 80 utilized in conjunction with the load distribution means 72 to obtain the rigid coupling required such that any load on the wall 60 is substantially equally distributed thereacross. The coupling means may include a plurality of spaced apart fasteners 82 that may be in the form of rivets having a head 84 at one end thereof and a countersunk portion 86 at the opposite end thereof, as illustrated in FIGS. 5 and 6. Appropriate apertures are provided in plate 74, wall 60, and base 16 to receive the fasteners therethrough. Various metals well-known in the art may be utilized to fabricate the snap assembly 12.

Without the provision of the load distribution means 72, it was found that cracking occurred around the apertures in the wall 60. It must be appreciated that for aircraft applications, such as in a parachute system, loads as high as 2,000 pounds may be transmitted to the assembly 10. It is with these load characteristics in mind that the inventors set out to provide an assembly that would not be subject to material fatigue and fracture.

To avoid a stress buildup in the locking member 54 and simultaneously permitting the necessary translation of the free end 58, there has been provided resilient means 90 for continuously urging the free end 58 of the locking member 54 into pressural abutting engagement with the inner surface 36 of the hook 32 and being movable toward and away from the inner surface 36.

The resilient means 90 comprises a rib 92 integrally joined by an arcuate configuration 94 at one end thereof with the wall 60 and extending upwardly therefrom. A clip 96 is integrally joined by an arcuate configuration 98 at one end thereof with the other end of the rib 92. The clip 96 terminates in the free end 58 of the locking member 54 and is inclined upwardly relative to the base 16 for movement relative thereto. The movement of the locking member 54 provides an angle of deflection in the clip 96 and in the rib 92 so as to obtain a relatively large translation of the free end 58 of the locking member 54 while maintaining a relatively low stress concentration in the locking member 54 by distribution of the stress in each arcuate configuration 94 and 98, respectively.

By providing this double bend relationship, it is possible to distribute the bending stress over the arcuate configurations 94 and 98. The arcuate configurations 94 and 98 may be substantially conformal to each other and formed of a radius in the range of 0.010 inches to 0.100 inches. For the thickness of material for the locking member 54, as discussed above, a bend radius of 0.060 inches may be utilized. This provides a stiffness characteristic to the clip 96 and rib 92 such that the angle of deflection of the clip from the position illustrated in FIG. 5 to that illustrated in FIG. 6, by the movement in the direction of arrow 100, causes substantially equal deflection of the rib 92. In this manner the rib 92 becomes inclined with respect to wall 60 an amount equal to displacement of the clip 96 as it is moved into the position of FIG. 6. It has been found that this arrangement provides a relatively low stress concentration in each of the corners defined by the arcuate configuration 94 and 98. At the same time there is sufficient resilience in the locking member 54 to return to its initial position illustrated in FIG. 1 after the manual force applied to deflect it has been released.

If desired, the radius defined by the arcuate configuration 94 and 98 may be varied such that the angle of inclination of clip 96 and rib 92 need not be equal, but yet the same desired end result of a low stress concentration may be obtained. In effect, the stress buildup is now being dissipated along two corners rather than one corner as is well known in the prior art.

Referring further to the drawings, there is illustrated in FIGS. 7 through 10 another embodiment of the present invention of a snap and buckle assembly 10a. It has been found that it is desirable for certain applications that the user of the assembly 10a have knowledge of the fact when the buckle member 40a is not seated in the position illustrated in FIG. 7. To accomplish this end there is provided indicating means 102a for apprising the user of the snap assembly 12a when the buckle element 38a is interposed between the inner surface 36a of the hook 32a and the free end 58a of the locking member 54a.

The indicating means 102a may include a groove 104a extending transversely through the base 16a and disposed substantially centrally between the sides 26a of base 16a. A closing member 106a having a terminal end 108a, that is integrally formed with the locking member 54a and extending towards the base 16a is provided. The closing member 106a being in alignment with the groove 104a for movement therein. The terminal end 108a of the closing member 106a being disposed above the lower surface 24a in the normal position of the locking member 54a. The terminal end 108a of the closing member 106a being disposed beyond the lower surface 24a when the buckle element 38a is interposed intermediate said inner surface 36a of the hook 32a and the locking member 54a such that the user of the snap assembly 12a may readily determine that the buckle element 38a is improperly positioned.

Figures 9, 10:
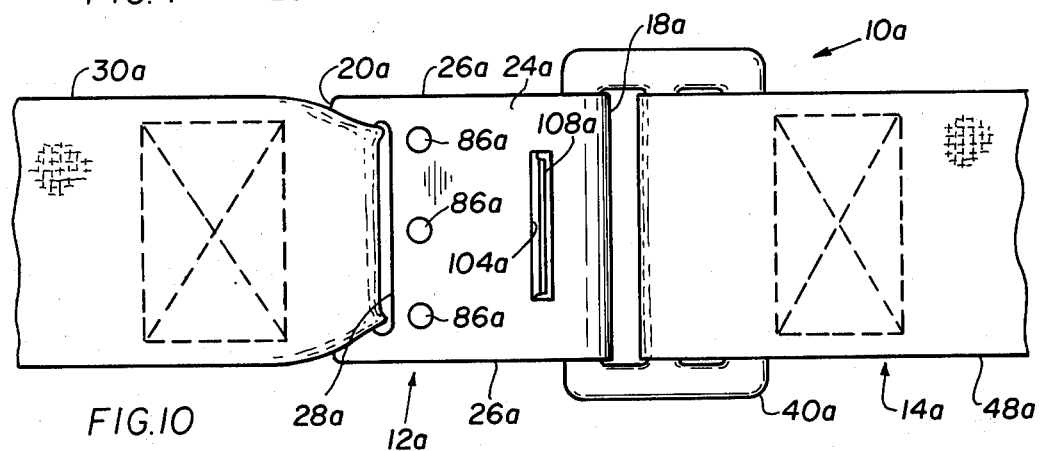
FIG. 9 is a side plan view of the snap and buckle assembly in a particular position with the locking member depressed.
FIG. 10 is a bottom plan view of the embodiment of the invention illustrated in FIG. 7.

In this manner, as illustrated in FIG. 9, the terminal end 108a is easily both visible and may be readily detected by a finger of the user. When the terminal end 108a protrudes beyond lower surface 24a, the user is immediately apprised that the buckle 14a is improperly positioned. This is an important safety feature for the user. The free end 58a includes a pair of spaced apart projections 110a with the closing member 108a disposed intermediate the projections 110a.

There is also provided in this embodiment closing means 112a that may act in combination with the indicating means 102a or independently thereof. The closing means includes the closing member 106a and is provided such that in the normal position of the closing member 108a, as illustrated in FIG. 7, the terminal end 108a is positioned within the groove 104a. In this manner when the buckle member 40a is disposed as indicated by the broken lines in FIG. 7 and in the direction of arrows 114a, it is still possible to confine the buckle element 38a within the hook 32a. The stop member in this instance is the rear wall of groove 104a, which prevents rearward movement of the closing member 106a by any force applied thereagainst by the buckle element 38a.

In contrast to the prior art, by maintaining the terminal end 108a within the groove 104a, then the rearward wall of groove 104a acts as a stop member to confine any rearward displacement of the closing member 106a. The free end 58a of the locking member 54a is adapted to engage the inner surface 36a of hook 32a.

Accordingly, it will be appreciated that the snap and buckle assembly 10a of the present design may be used wherever it is desired to provide a strong reliable quick release snap assembly that can be provided with the various features enumerated herein. Various materials may be selected to obtain the desired end results.

Although illustrative embodiments of the invention have been described in detail herein with reference to the accompanying drawings, it is to be understood that the invention is not limited to these precise embodiments and that various changes and modifications may be effected therein without departing from the scope or spirit of the invention.

What is claimed is:

1. A snap assembly adapted to receive a cooperating buckle element; said snap assembly comprising:
 A. a base having oppositely disposed front and rear ends, with upper and lower surfaces intermediate said ends, and spaced apart sides extending between said front and rear surfaces,
 B. a hook integrally formed with said front end of said base and extending inwardly in the direction of said rear end and terminating in a distal end,
 C. said hook having an inner surface bounding one side of said hook facing said upper surface of said base for forming an enclosure for receiving the buckle element therein,
 D. a flexible locking member adapted to be moved relative to said inner surface of said hook, said locking member having an outer end and an oppositely disposed free end, with spaced apart sides intermediate said ends, said outer end formed by a wall having one surface thereof extending in overlapping relationship with and secured to said base, the width of said base and said locking member as defined respectively by each of said spaced apart sides being substantially equal to each other, E. load distribution means extending in overlapping relationship to the oppositely disposed surface of said wall, said load distribution means including a plate extending transversely between said spaced apart sides of said base and said locking member, F. coupling means for securing said base, said wall, and said plate to each other, such that any load on said wall is distributed across said plate, said coupling means comprises a plurality of spaced apart fasteners, G. resilient means for continuously urging said free end of said locking member into abutting pressural engagement with said inner surface of said hook and being movable toward and away from said inner surface, and H. said resilient means comprising
   1. a rib integrally joined by an arcuate configuration at one end thereof with said wall and extending upwardly therefrom,
   2. a clip integrally joined by an arcuate configuration at one end thereof with the other end of said rib, said arcuate configurations each being in the form of radii that are substantially conformal to each other with said clip terminating in said free end of said locking member and inclined upwardly relative to said base for movement relative thereto, and
   3. said movement of said locking member providing an angle of deflection in said clip and in said rib so as to obtain a relatively large translation of said free end of said locking member while maintaining a relatively low stress concentration in said locking member by distribution of said stress in each said arcuate configuration.

2. A snap assembly as in claim 1, including a slot extending transversely on said base adjacent said rear end for receiving a strap therethrough.

3. A snap assembly as in claim 1, wherein said fasteners are rivets.

4. A snap assembly as in claim 1, wherein said angle of deflection of said clip and said rib are substantially equal to each other.

5. A snap assembly as in claim 1, wherein each said radius is in the range of 0.010 inches to 0.100 inches.

6. A snap assembly as in claim 1, including indicating means for apprising the user of the snap assembly when the buckle element is interposed between said inner surface of said hook and said free end of said locking member.

7. A snap assembly as in claim 6, wherein said indicating means comprises
   a. a groove extending transversely through said base,
   b. a closing member having a terminal end, said closing member being integrally formed with said locking member and extending towards said base,
   c. said closing member being in alignment with said groove for movement therein,
   d. said terminal end of said closing member disposed above said lower surface in the normal position of said locking member, and
   e. said terminal end of said closing member being disposed beyond said lower surface when the buckle element is interposed intermediate said inner surface of said hook and said locking member, such that the user of the snap assembly may readily determine that the buckle element is improperly positioned.

8. A snap assembly as in claim 7, wherein said groove is disposed substantially centrally on said base.

9. A snap assembly as in claim 7, wherein said free end includes a pair of spaced apart projections with said closing member disposed intermediate said projections.

10. A snap assembly adapted to receive a cooperating buckle element, said snap assembly comprising:
   A. a base having oppositely disposed front and rear ends with upper and lower surfaces intermediate said ends, and spaced apart sides extending between said front and rear ends,
   B. a hook integrally formed with said front end of said base and extending inwardly in the direction of said rear end and terminating in a distal end,
   C. said hook having an inner surface bounding one side of said hook facing said upper surface of said base for forming an enclosure for receiving the buckle element therein,
   D. a flexible locking member adapted to be moved relative to said inner surface of said hook, said locking member having an outer end and an oppositely disposed free end, with spaced apart sides intermediate said ends, said outer end formed by a wall having one surface thereof extending in overlapping relationship to said upper surface of said base, the width of said base and said locking member as defined respectively by each of said spaced apart sides being substantially equal to each other,
   E. load distribution means extending in overlapping relationship to the oppositely disposed surface of said wall, said load distribution means including a plate extending transversely between said spaced apart sides of said base and said locking member,
   F. coupling means for securing said base, said wall, and said plate to each other, such that any load on said wall is distributed across said plate, said coupling means comprises a plurality of spaced apart fasteners,
   G. resilient means for continuously urging said free end of said locking member into engagement with said inner surface of said hook and being movable toward and away from said inner surface,
   H. said resilient means comprising
      1. a rib integrally joined by an arcuate configuration at one end thereof with said wall and extending upwardly therefrom,
      2. a clip integrally joined by an arcuate configuration at one end thereof with the other end of said rib, said arcuate configurations each being in the form of a radius that is substantially conformal to the other with said clip terminating in said free end of said locking member and inclined upwardly relative to said base for movement relative thereto, and
      3. said movement of said locking member providing an angle of deflection in said clip and in said rib so as to obtain a relatively large translation of said free end of said locking member while maintaining a relatively low stress concentration in said locking member by distribution of said stress in each said arcuate configuration,
   I. indicating means for apprising the user of the snap assembly when the buckle element is interposed between said inner surface of said hook and said free end of said locking member,
   J. said indicating means comprises:
      1. a groove extending transversely through said base, 2. a closing member having a terminal end, said closing member being integrally formed with said locking member and extending towards said base,
3. said closing member being in alignment with said groove for movement therein,
4. said terminal end of said closing member disposed above said lower surface in the normal position of said locking member, and
5. said terminal end of said closing member being disposed beyond said lower surface when the buckle element is interposed intermediate said inner surface of said hook and said locking member, such that the user of the snap assembly may readily determine that the buckle element is improperly positioned.

11. A snap assembly as in claim 10, wherein said fasteners are rivets.

12. A snap assembly as in claim 10, said inner surface of said hook having an arcuate configuration at said front end of said base.

13. A snap assembly as in claim 10, wherein said groove is disposed substantially centrally on said base.

14. A snap assembly as in claim 10, wherein said free end includes a pair of spaced apart projections with said closing member disposed intermediate said projections.

15. A snap and buckle assembly comprising in combination:
A. a base having oppositely disposed front and rear ends with upper and lower surfaces intermediate said ends as well as spaced apart sides extending between said front and rear surfaces, and a harness extending outwardly from said rear end,
B. a hook integrally formed with said front end of said base and extending inwardly in the direction of said rear end and terminating in a distal end,
C. said hook having an inner surface bounding one side of said hook facing said upper surface of said base for forming an enclosure for receiving the buckle element therein,
D. a flexible locking member adapted to be moved relative to said inner surface of said hook, said locking member having an outer end and an oppositely disposed free end, with spaced apart sides intermediate said ends, said outer end formed by a wall having one surface thereof extending in overlapping relationship with and secured to said base, the width of said base and said locking member as defined respectively by each of said spaced apart sides being substantially equal to each other,
E. load distribution means extending in overlapping relationship to the oppositely disposed surface of said wall, said load distribution means including a plate extending transversely between said spaced apart sides of said base and said locking member,
F. coupling means for securing said base, said wall, and said plate to each other, such that any load on said wall is distributed across said plate, said coupling means comprises a plurality of spaced apart fasteners,
G. a buckle having a buckle element at one end thereof and a harness extending outwardly from the oppositely disposed end of said buckle,
H. said buckle element having a width less than the spacing between said upper surface of said base and said inner surface of said hook so as to readily assume random positions relative to said base and be inserted and removed from said hook when said free end of said locking member is depressed,
I. resilient means for continuously urging said free end of said locking member into abutting pressural engagement with said inner surface of said hook and being movable toward and away from said inner surface, and
J. said resilient means comprising
1. a rib integrally joined by an arcuate configuration at one end thereof with said wall and extending upwardly therefrom,
2. a clip integrally joined by an arcuate configuration at one end thereof with the other end of said rib, said clip terminating in said free end of said locking member and inclined upwardly relative to said base for movement relative thereto, and
3. said movement of said locking member providing an angle of deflection in said clip and in said rib so as to obtain a relatively large translation of said free end of said locking member while maintaining a relatively low stress concentration in said locking member by distribution of said stress in each said arcuate configuration.

16. A snap and buckle assembly as in claim 15, including indicating means for apprising the user of the snap and buckle assembly when the buckle element is interposed between said inner surface of said hook and said free end of said locking member.

17. A snap and buckle assembly as in claim 16, wherein said indicating means comprises
a. a groove extending transversely through said base,
b. a closing member having a terminal end, said closing member being integrally formed with said locking member and extending towards said base,
c. said closing member being in alignment with said groove for movement therein,
d. said terminal end of said closing member disposed above said lower surface in the normal position of said locking member, and
e. said terminal end of said closing member being disposed beyond said lower surface when the buckle element is interposed intermediate said inner surface of said hook and said locking member, such that the user of the snap and buckle assembly may readily determine that the buckle element is improperly positioned.

18. A snap and buckle assembly as in claim 15, including closing means operatively associated with said hook for limiting the movement of the buckle element, said closing means comprising
a. a groove extending transversely through said base,
b. a closing member having a terminal end in alignment with said groove for movement therein,
c. said closing member coupling to said locking member and extending towards said base, and
d. said terminal end of said closing member disposed within said groove in the normal position of the snap and buckle assembly, so as to prevent rearward movement of said closing member by any force applied thereagainst by the buckle element.

* * * * *